United States Patent [19]

Kataumi et al.

[11] Patent Number: 5,695,429

[45] Date of Patent: Dec. 9, 1997

[54] SHIFT LOCK ARRANGEMENT OF AUTOMATIC TRANSMISSION SHIFT LEVER DEVICE

[75] Inventors: Yoshimasa Kataumi; Yasuyuki Ikegami, both of Kosai, Japan

[73] Assignee: Fuji Kiko Co., Ltd., Tokyo, Japan

[21] Appl. No.: 496,096

[22] Filed: Jun. 28, 1995

[30] Foreign Application Priority Data

Jun. 30, 1994 [JP] Japan ................... 6-148891

[51] Int. Cl.$^6$ ................... B60K 41/26; F16H 59/10; F16H 61/22

[52] U.S. Cl. ................... 477/96; 74/483 K; 192/4 A

[58] Field of Search ................... 192/4 A; 74/477, 74/483 R, 483 K, 475; 477/96

[56] References Cited

U.S. PATENT DOCUMENTS

| | | | |
|---|---|---|---|
| 4,905,802 | 3/1990 | Gotoh | 192/4 A |
| 5,014,831 | 5/1991 | Wawra et al. | 192/4 A |
| 5,031,737 | 7/1991 | Dzioba et al. | 192/4 A |

FOREIGN PATENT DOCUMENTS

| | | |
|---|---|---|
| 0 373 368 | 6/1990 | European Pat. Off. . |
| 0 495 667 | 7/1992 | European Pat. Off. . |
| 0 612 640 | 8/1994 | European Pat. Off. . |

*Primary Examiner*—Charles A. Marmor
*Assistant Examiner*—Troy Grabow
*Attorney, Agent, or Firm*—Foley & Lardner

[57] ABSTRACT

A shift lock arrangement for an automatic transmission shift lever device having a shift lock lever in contact with a position pin of the shift lever device positioned in a parking position has a lock lever in contact with the shift lock lever to restrict the movement of the position pin in the parking position. A key lock unit is connected with the shift lock lever so that the shift lock lever keeps latching the position pin in the parking position when an automotive key is not set therein. A slidable stopper pin is connected with a push rod pushed by a brake pedal in a released condition. The stopper pin latches the shift lock lever so as to prevent the movement of the position pin from the parking position to the other positions when the brake pedal is in the released condition. When the brake pedal is depressed, the push rod is released from the brake pedal and the stopper pin is disengaged from the shift lock lever. Therefore, the shift lever device is locked in the parking position when the key is not set in the key lock unit or when the brake pedal is not depressed.

6 Claims, 4 Drawing Sheets

5,695,429

SHIFT LOCK ARRANGEMENT OF AUTOMATIC TRANSMISSION SHIFT LEVER DEVICE

BACKGROUND OF THE INVENTION

1. Field of the Invention

The present invention relates to an automotive vehicle having a shift lever of an automatic transmission, and more particularly to a shift lock arrangement of an automatic transmission shift lever device.

2. Description of the Prior Art

Various shift lock arrangements for a shift lever device have been proposed, practically to prevent a radical starting due to incorrect vehicle operation in an automotive vehicle equipped with an automatic transmission. Generally, such shift lock arrangements are arranged to forbid shifting of a shift lever from a parking position to other positions if a brake pedal is not depressed, even if an engine of the vehicle is operated. Japanese Utility Model Provisional Publication No. 2-96314 discloses a mechanical-type shift lock arrangement wherein an end of a lock cable is interconnected with a brake pedal and the other end of the lock cable is arranged to restrict a position pin of an automatic transmission shift lever device through a lock unit according to a depressing operation of the brake pedal. Furthermore, Japanese Utility Model Provisional Publication No. 64-35131 discloses another shift lock arrangement arranged to lock the shifter in a parking position if a key is not set in a key lock unit.

However, since these shift lock arrangements are arranged so that a lock lever for restricting the movement of the position pin and a shift lock lever connected with a lock cable are integrally formed as a lock cam, a force for pushing down the position pin in a cut-out of a detent plate is directly applied to the lock cam and the lock cable. Therefore, this force may cause deformation or breakage of parts and generate incorrect operation of the shift lock arrangement. Furthermore, in the case where the lock cable is directly connected with the brake pedal, if the lock lever or lock cable is stuck, a proper braking operation can be prevented.

SUMMARY OF THE INVENTION

It is an object of the present invention to provide an improved shift lock arrangement that solves the above-mentioned problems.

A first aspect of the present invention resides in a shift lock arrangement for an automatic transmission shift lever device, which includes a position pin movable between a parking position and other positions in a detent plate by manually operating a shift lever. The shift lock arrangement comprises a base plate fixed on the detent plate. A shift lock lever is rotatably installed on the base plate and is in contact with the position pin positioned in the parking position. A lock lever is in contact with the shift lock lever and restricts the movement of the position pin in the parking position with the shift lock lever. A key lock unit is connected to the shift lock lever so that the shift lock lever maintains the position pin latched in the parking position when an automotive key is not set in the key lock unit. A stopper pin is slidable on the base plate and latches the shift lock lever so as to forbid the movement of the position pin from the parking position to the other positions when the brake pedal is not depressed. A push rod is connected to the stopper pin and is in contact with a brake pedal when the brake pedal is not depressed. The push rod is released from the brake pedal and moved to release the stopper pin from the shift lock lever when the brake pedal is depressed.

A second aspect of the present invention resides in an interlock mechanism for an automatic transmission shift lever device in an automotive vehicle. The shift lever device includes a position pin movable between a parking position and the other positions by manually operating a shift lever. The interlock mechanism comprises a shift lock means for maintaining the device in the parking position by latching the position pin. The shift lock means is constantly rotatably biased by a spring force to release the position pin. A fixing means functions to fix the shift lock means. The fixing means slides to take one of a first state in that the fixing means is set to keep latching the position pin in the parking position and a second state in that the fixing means is inoperative so as to release the shift lock means. The fixing means is in contact with a brake pedal of the automotive vehicle and is put in the first state when the brake pedal is not depressed. A key lock means prevents shifting from the parking position to the other position by fixing the shift lock means when a key for operating the automotive vehicle is not set in the key lock means.

BRIEF DESCRIPTION OF THE DRAWINGS

FIG. 1 shows the shift lever in the unlocked park position with the brake depressed to allow the shift lever to move to other positions and where the position pin is released from the park position so that it can be moved to other positions.

DETAILED DESCRIPTION OF THE INVENTION

Figure 1:
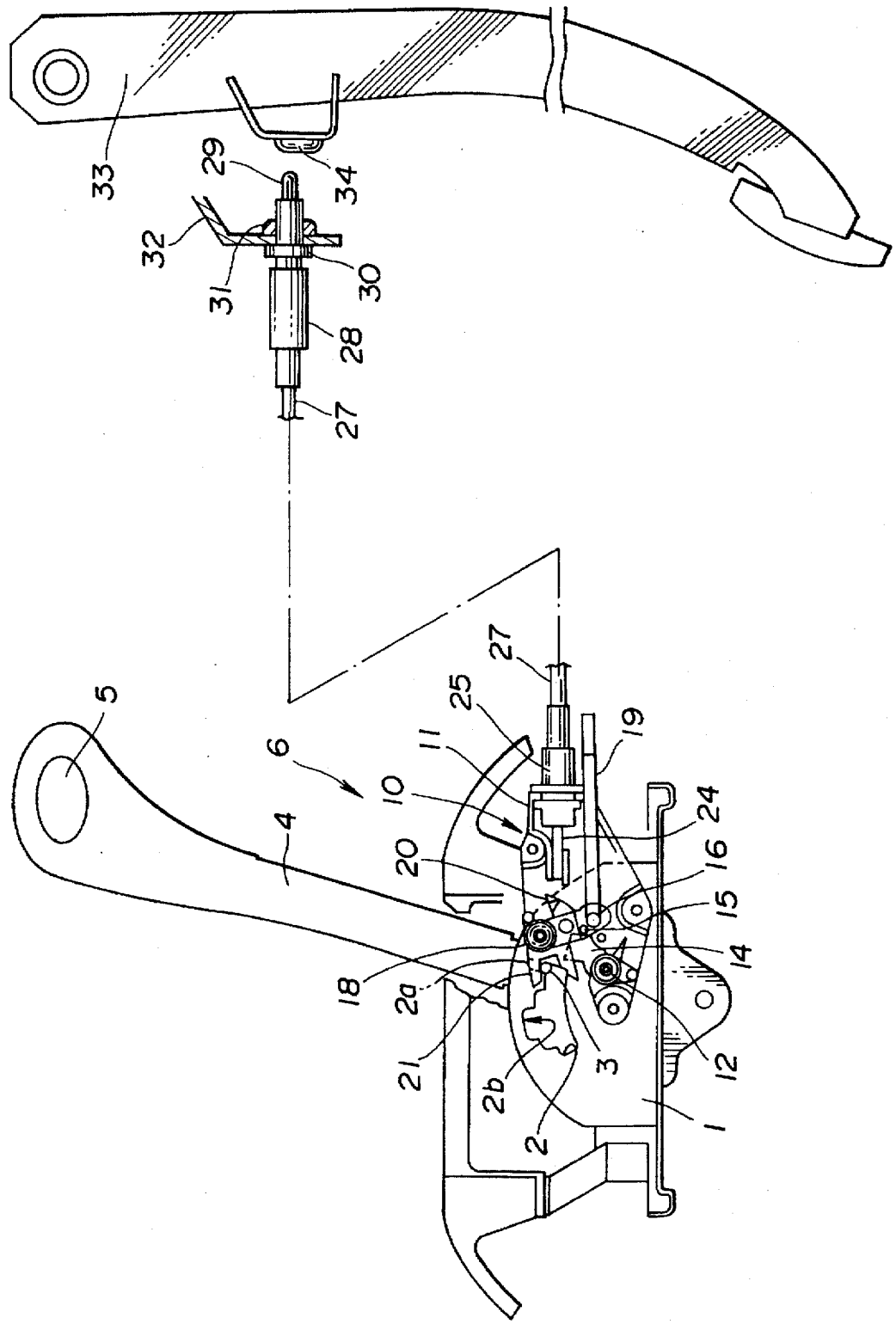
FIG. 1 is a structural view of an embodiment of a shift lock arrangement according to the present invention, which is applied to an automatic transmission shift lever device.

Referring to FIGS. 1 to 4, there is shown an embodiment of a shift lock arrangement 10 for an automatic transmission shift lever device 6 according to the present invention. The automatic transmission shift lever device 6 is for an automatic transmission installed in an automotive vehicle. The shift lock arrangement 10 is of an interlock mechanism that prevents an incorrect activation of the automatic transmission shift lever device 6. The shift lock arrangement 10 comprises a base plate 11 installed to a detent plate 1 of the automatic transmission shift lever device 6. The detent plate 1 has a detent cut-out portion 2 which includes a parking position 2a (P position and) other positions 2b (R, N, D and 2 shift positions). The shift lock arrangement 10 is installed to a near portion of the parking position 2a of the detent cut-out portion 2.

The automatic transmission shift lever device 6 includes a position pin 3 engaged with the parking position 2a or one of the other position 2b by moving a shift lever 4 in the fore-and-aft direction of the automotive vehicle. In FIG. 1, the shift lever device 6 is moved in the left-right direction in order to execute shifting of the automatic transmission. When the shift position is moved from the parking position 2a to the other positions 2b, the position pin 3 engaged with the parking position 2a is released by pushing a knob bottom 5 and by moving the shift lever 4 backward of the automotive vehicle.

A lock lever 14 of the shift lock arrangement 10 is axially rotatably supported on the base plate 11 through a shaft 12 and is biased in the clockwise direction by means of a spring 13. The lock lever 14 is rotated within the parking position 2a by sliding on the pin 15. That is, the lock lever 14 is slidingly in contact with the pin 15, protrudes from on a shift lock lever 16. The spring 13 applies a rotational biasing force to the lock lever 14 so as to rotate it out of the parking position 2a. The shift lock lever 16 is rotatably supported on the base plate 11 through a shaft 17.

The shift lock lever 16 is rotatably supported to an end portion of a key lock rod 19, which end portion is perpendicularly bent and connected with the shift lock lever 16. The shift lock lever 16 is integrally formed with a cam portion 20, which is engageable with a stopper pin 24, and a lever portion 21, which is engageable with the position pin 3. The key lock rod 19 is interconnected with a key lock unit 19b through a bendable interconnecting means, such as a lock cable 19a.

When a key is inserted into the key lock unit 19b and rotated, the key lock rod 19 swings so that the shift lock lever 16 is released from a rotational restriction by a function of a cam installed in the key lock unit 19. A support lever 22 is not integral with the shift lock lever 16 and is axially and rotatably supported on the shaft 17. The support lever 22 is biased toward a lever portion 21 by a spring 18. The lever portion 21 and the support lever 22 are arranged to clump or latch the position pin 3 and to move with the shift lock lever 16.

Furthermore, a pair of guides 23 are integrally formed with the base plate 11 to form a predetermined space therebetween. The stopper pin 24 is installed between the guides 23 so as to be horizontally slidingly movable. The stopper pin 24 is arranged so as to be engaged with and disengaged from the cam portion 20 of the shift lock lever 16 according to a depressed condition of a brake pedal 33. The stopper pin 24 is made of a resilient material, such as plastic resin, so as to be easily bent toward the guide-free direction relative to the guides 23, for example, the front direction as viewed from FIG. 2. Since the guides 23 support the stopper pin 24 in the vertical direction of the vehicle, only a shearing force is applied to the stopper pin 24 by the rotating force of the lock lever and therefore a high-rigidity of the stopper pin 24 is ensured.

Figure 2:
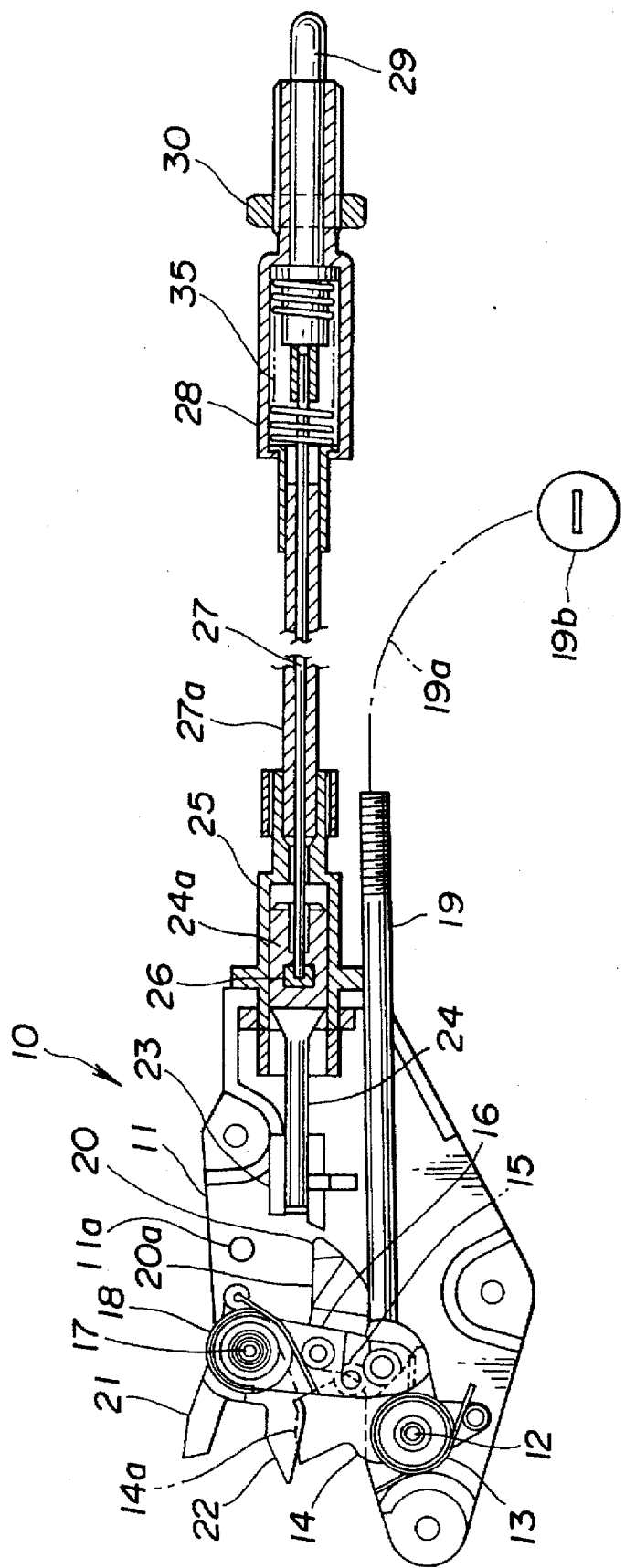
FIG. 2 is a side view, partially in cross-section, of the shift interlock arrangement of FIG. 1.
Figure 4:
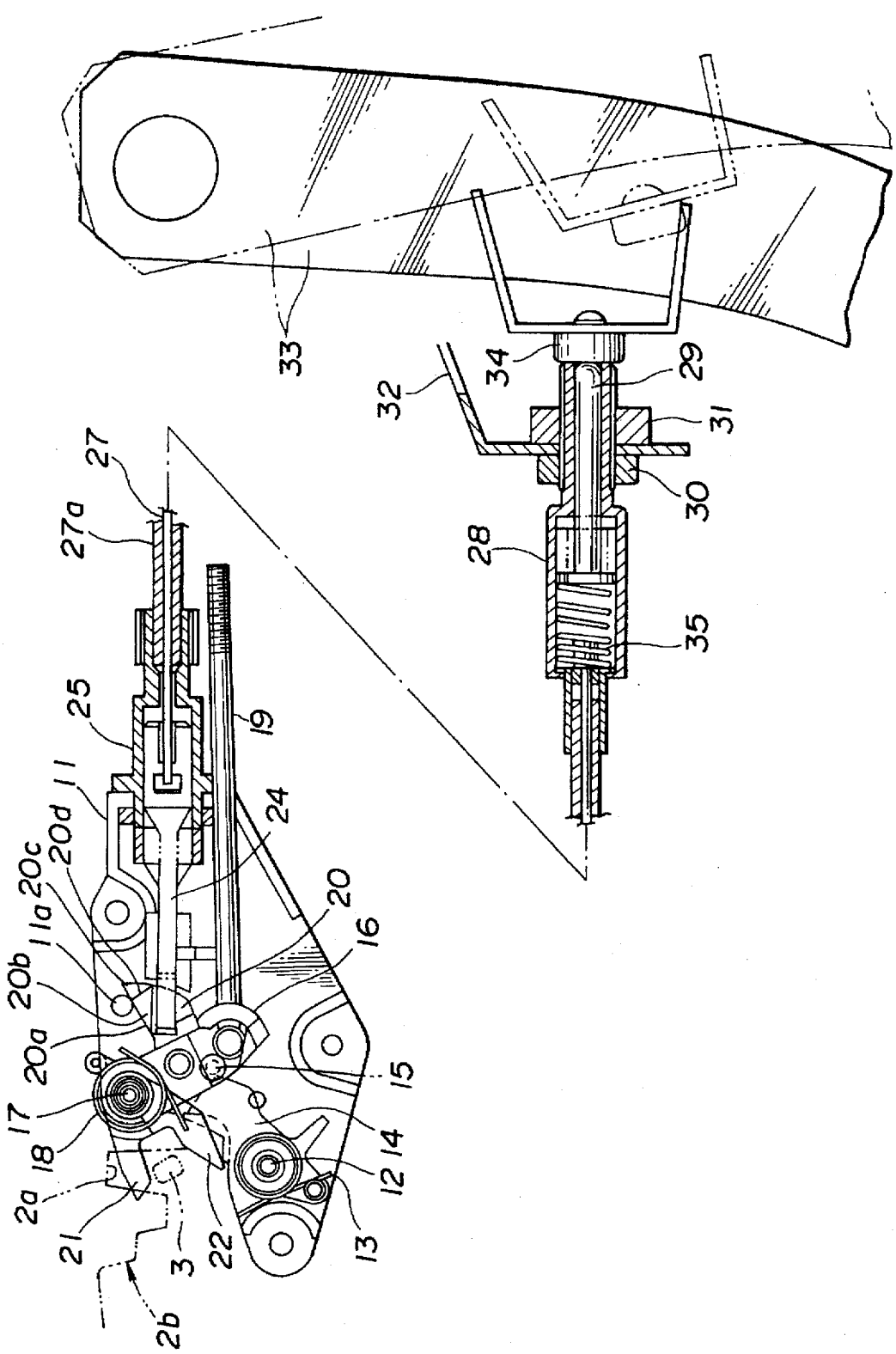
FIG. 4 is a side view similar to FIG. 2, illustrated to explain the operation of the shift lock arrangement, with the shift lever device shown in phantom for clarity.

The stopper pin 24, as shown in FIG. 2, has a large shaft portion 24a that is axially movably inserted into a cylindrical holder 25 fixed to the base plate 11. An end portion of the lock cable 27 is interconnected with the large shaft portion 24a through a wire end 26. An intermediate portion of the lock cable 27 is covered with a tube 27a having a predetermined length. The other end portion of the lock cable 27 is inserted in a holder 28 and connected with a push rod 29, which is axially movably inserted in the holder 28. As shown in FIG. 4, the holder 28 is fixed through nuts 30 and 31 to a bracket 32 properly fixed to a vehicle body.

The bracket 32 is fixed in the vicinity of the brake pedal 33 as shown in FIG. 4. The push rod 29 is arranged to be perpendicular with a contacting member 34 installed to a brake pedal 33. The push rod 29 is biased by a coil spring 35 installed in the holder 28 so as to protrude toward the brake pedal 33. Accordingly, if the brake pedal 33 is not depressed by a driver, the push rod 29 is pushed in the holder 28 so that the stopper pin 24 protrudes from the guides 23 and is in contact with an upper surface 20a of the cam member 20 to prevent the shift lock lever 16 from rotating.

Figure 3:
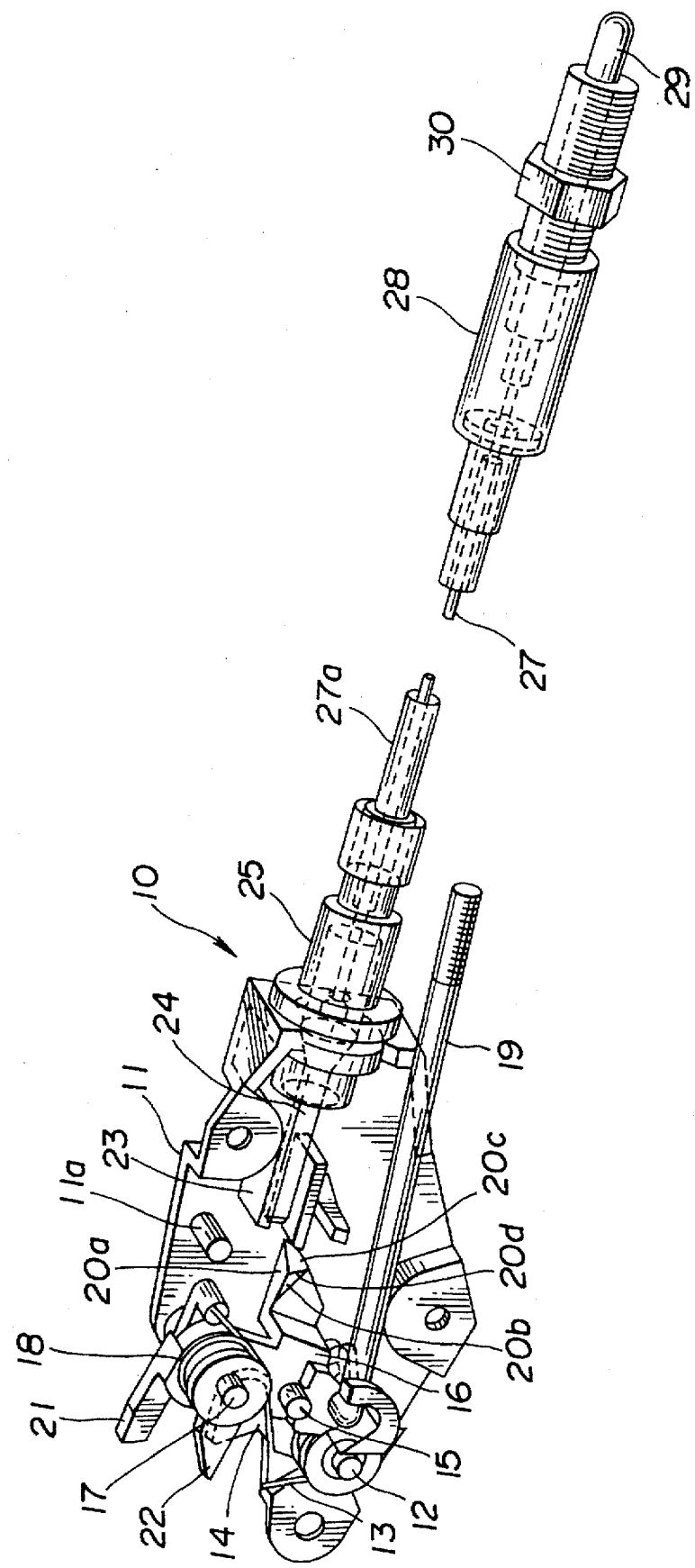
FIG. 3 shows a perspective view of the shift interlock arrangement of FIG. 1.

The cam portion 20 of the shift lock lever 16 is constituted by a triangular upper surface portion 20a and two triangular taper surface portions 20b and 20c as shown in FIG. 3. In the case where the cam portion 20 is positioned at an upper portion of the stopper pin 24 and that the position pin 3 is moved toward a parking position 2a without a depression of the brake pedal 33, the shift lock lever 16 is rotated clockwise in FIG. 4 due to an upward movement of the position pin 3, and the intersect portion 20d between the taper surfaces 20b and 20c slidably passes the stopper pin 24 while bending the stopper pin 24. Therefore, the cam portion 20 can be moved downwardly past the stopper pin 24.

Next, the manner of operation of the shift lock arrangement according to the present invention will be discussed hereinafter.

When the engine of the vehicle is started by inserting and rotating the key in the key lock unit 19, the restriction of the key lock unit 19 is released. The shift lock lever 16 is put in a rotatable condition around the shaft 17. However, since the stopper pin 24 is in contact with the upper surface portion 20a of the cam portion 20 of the shift lock lever 16, the shift lock lever 16 is prevented from being rotated.

When the contacting member 34 is released from the push rod 29 by the depression of the brake pedal 33, the push rod 29 protrudes toward the brake pedal 33 due to the force of the coil spring 35. Therefore, the stopper pin 24 is pulled within the guides 23 through the lock cable 27 and is released from the upper portion 20a of the cam portion 20 of the stopper pin 24. Accordingly, the shift lock lever 16 is rotated counterclockwise around the shaft 17 in FIG. 4 while moving downwardly past the position pin 3 through the support lever 22, and is stopped by the stopper 11a. Since the pin 15 is moved rightward, as shown in FIG. 4, with the rotation of the shift lock lever 16, the lock lever 14 is rotated clockwise in due to the force of the spring 13 while sliding on the pin 15. Accordingly, the position pin 3 can be moved to the other positions 2b as shown in FIG. 4, which shows a condition where the brake pedal 33 is released.

When the brake pedal 33 is not depressed so that the push rod 29 is pushed by the contacting member 34, the stopper pin 24 is in contact (or engaged) with the cam portion 20, and both the shift lock lever 16 and the lock lever 14 can not be rotated. Accordingly, even if the knob bottom 5 of the shift lever 4 is depressed, the position pin 3 is in contact with the head portion 14a of the lock lever 14 and restricted in the parking position 2a. That is, the shift lever 4 is fixed within the parking position 2a so as not to be moved to the other shift positions 2b.

When the brake pedal 33 is not depressed during a vehicle running condition, as shown in FIG. 4, the push rod 29 is depressed in the holder 28 by the brake pedal 33. Accordingly, the stopper pin 24 is protruded from the guides 23 toward the cam portion 20. However, since the cam portion 20 is located at a higher position than a position of the stopper pin 24 during the vehicle running condition, that is, since the shift position is not set at the parking position 2a, the stopper pin 24 is not in contact with the cam member 20, including the taper surfaces 20b and 20c and the intersect portion 20d, the stopper pin 24 does not prevent the operation of the shifting during the vehicle running condition.

When the vehicle is stopped by the depression of the brake pedal 33 and the position pin 3 is moved toward the parking position 2b by the operation of the shift lever 4 to the P position, the position pin 3 is guided into a portion between the lever portion 21 and the support lever 22, and the position pin 3 is moved upward. Accordingly, the shift lock lever 16 is rotated clockwise as viewed from FIGS. 1–4 around the shaft 17, and the lock lever 14 is rotated counterclockwise as viewed from FIGS. 1–4 by the pin 15 so as to restrict movement of the position pin 3. By the releasing the brake pedal 33, the stopper pin 24 comes in contact with the upper surface portion 20a of the cam portion 20 to prevent the rotation of the shift lock lever 16. Further, by releasing the key from the key slot of the key lock unit 19b, the lock lever 14 is locked by the key lock unit 19b through the key lock rod 19.

During the parking of the vehicle, if the engine is started without the releasing of the key lock unit 19b, the shift lock lever 16 is not rotated by the restriction of the key lock rod 19 even if the brake pedal 33 is depressed. Therefore, the rotation of the lock lever 14 is restricted by the pin 15, and the position pin 3 is in contact with the head portion 14a of the lock lever 14 so as to be restricted in the parking position 2a. Accordingly, the shift lever 4 can not be moved to the other positions 2b and therefore the vehicle can not be set in a running condition.

In case where the shift lever 4 is moved from the other position 2b to the parking position 2a without depressing the brake pedal 33, the position pin 3 is moved upward and the shift lock lever 16 is rotated clockwise. Accordingly, the stopper pin 24 is bent outward due to the taper surfaces 20b and 20c of the cam portion 20 and therefore the shift lock lever 16 is rotated without being prevented by the stopper pin 24.

With this arrangement, since the push-down force to the position pin 3 is directly applied to the lock lever 14 and rarely applied to the shift lock lever 16 and the lock cable 27, deformation and breakage of the shift lock lever 16 and the lock cable 27 are prevented. Also, since the lock cable 27 is not connected with the brake pedal 33, even if the lock cable 27 causes some troubles such as sticking, the operation of the brake pedal 33 is not prevented by the trouble of the lock cable 27.

Since the stopper pin 24 is formed by a resilient material such as a plastic resin and is supported by the guides 23, even if the shift lever 4 is moved from the other operating positions to the parking position without the depression of the brake pedal 33, the stopper pin 24 is elastically bent and rides across the cam portion 20 of the shift lock lever 16 without breakage.

While the described embodiment represents the preferred form of the present invention, it is to be understood that modifications will occur to those skilled in that art without departing from the spirit of the invention. The scope of the invention is therefore to be determined solely by the appended claims.

What is claimed is:

1. A shift lock arrangement for an automatic transmission shift lever device, the shift lever device including a position pin movable between a parking position and other positions in a detent plate by manually operating a shift lever, said shift lock arrangement comprising:

a base plate fixed on the detent plate;

a shift lock lever rotatably installed on said base plate, said shift lock lever being in contact with the position pin positioned in the parking position;

a lock lever in contact with said shift lock lever and restricting the movement of the position pin in the parking position with said shift lock lever;

a key lock unit connected to said shift lock lever so that said shift lock lever maintains the position pin latched in the parking position when an automotive key is not set therein;

a stopper pin slidable on said base plate, said stopper pin latching said shift lock lever so as to prevent the position pin from moving from the parking position to the other positions when a brake pedal is not depressed; and a push rod connected to said stopper pin, said push rod being adapted to be in contact with the brake pedal when the brake pedal is not depressed, said push rod being released from the brake pedal and moved to release said stopper pin from said shift lock lever when the brake pedal is depressed, wherein said shift lock lever includes a cam portion through which said shift lock lever engages said stopper pin to maintain the position pin latched in the parking position, the cam portion having an upper surface portion contactable with said stopper pin, two taper portions slidably contactable with said stopper pin, and an intersecting portion formed between the two taper portions.

2. A shift lock arrangement as claimed in claim 1, wherein said stopper pin is made of bendable resilient material so that the intersecting portion can move past the stopper pin when the shift position is changed from one of the other positions to the parking position while the stopper pin is engaged with the cam portion.

3. A shift lock arrangement as claimed in claim 1, wherein said shift lock lever is rotatable from a position pin released condition to a position pin latching condition even if said stopper pin is engaged with the cam portion.

4. A shift lock arrangement as claimed in claim 1, wherein said lock lever is rotatable on a shaft formed on said base plate and is slidably movable on a pin extending from said shift lock lever.

5. A shift lock arrangement for an automatic transmission shift lever device, the shift lever device including a position pin movable between a parking position and other positions in a detent plate by manually operating a shift lever, the shift lock arrangement comprising:

a base plate fixed on the detent plate;

a shift lock lever rotatably installed on the base plate, the shift lock lever being in contact with the position pin positioned in the parking position;

a lock lever in contact with the shift lock lever and restricting the movement of the position pin in the parking position with the shift lock lever;

a key lock unit connected to the shift lock lever so that the shift lock lever maintains the position pin latched in the parking position when an automotive key is not set therein;

a stopper pin slidable on the base plate, the stopper pin latching the shift lock lever to prevent the position pin from moving from the parking position to the other positions when a brake pedal is not depressed; and a push rod connected to the stopper pin, the push rod being adapted to be in contact with the brake pedal when the brake pedal is not depressed, the push rod being released from the brake pedal and moved to release the stopper pin from the shift lock lever when the brake pedal is depressed, wherein the shift lock lever is rotatable from a position pin released condition to a position pin latching condition even if the stopper pin protrudes and engages the shift lock lever to prevent the shift lock lever from rotating.

6. A shift lock arrangement for an automatic transmission shift lever device, the shift lever device including a position pin movable between a parking position and other positions in a detent plate by manually operating a shift lever, the shift lock arrangement comprising:

a base plate fixed on the detent plate;

a shift lock lever rotatably installed on the base plate, the shift lock lever being in contact with the position pin positioned in the parking position;

a lock lever in contact with the shift lock lever and restricting the movement of the position pin in the parking position with the shift lock lever;

a key lock unit connected to the shift lock lever so that the shift lock lever maintains the position pin latched in the parking position when an automotive key is not set therein;

a stopper pin slidable on the base plate, the stopper pin latching the shift lock lever to prevent the position pin from moving from the parking position to the other positions when a brake pedal is not depressed; and a push rod connected to the stopper pin, the push rod being adapted to be in contact with the brake pedal when the brake pedal is not depressed, the push rod being released from the brake pedal and moved to release the stopper pin from the shift lock lever when the brake pedal is depressed, wherein the lock lever is rotatable on a shaft formed on the base plate and is slidably movable on a pin extending from the shift lock lever.

* * * * *